(12) United States Patent
Lyadvinsky et al.

(10) Patent No.: US 10,095,589 B2
(45) Date of Patent: Oct. 9, 2018

(54) SYSTEM AND METHOD FOR OPTIMIZATION OF OPERATING SYSTEM RESTORE

(71) Applicant: Acronis International GmbH, Schaffhausen (CH)

(72) Inventors: Maxim V. Lyadvinsky, Moscow (RU); Andrey Redko, Moscow (RU); Ivan Kukhta, Moscow (RU); Anatoly Stupak, Sankt-Petersburg (RU); Serguei Beloussov, Singapore (SG); Stanislav M. Protassov, Moscow (RU); Mark Shmulevich, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 50 days.

(21) Appl. No.: 15/176,556

(22) Filed: Jun. 8, 2016

(65) Prior Publication Data

US 2016/0364144 A1 Dec. 15, 2016

Related U.S. Application Data

(60) Provisional application No. 62/172,869, filed on Jun. 9, 2015.

(51) Int. Cl.
| | |
|---|---|
| *G06F 9/44* | (2018.01) |
| *G06F 11/14* | (2006.01) |
| *G06F 9/4401* | (2018.01) |
| *G06F 9/46* | (2006.01) |

(52) U.S. Cl.
CPC ........ *G06F 11/1469* (2013.01); *G06F 9/4406* (2013.01); *G06F 9/461* (2013.01); *G06F 11/1417* (2013.01)

(58) Field of Classification Search
None
See application file for complete search history.

(56) References Cited

U.S. PATENT DOCUMENTS

| 5,778,430 A | * | 7/1998 | Ish | G06F 12/123 711/113 |
|---|---|---|---|---|
| 5,887,164 A | * | 3/1999 | Gupta | G06F 9/4406 709/222 |
| 5,926,836 A | * | 7/1999 | Blumenau | G06F 11/1469 711/162 |

(Continued)

*Primary Examiner* — Kaushikkumar Patel
(74) *Attorney, Agent, or Firm* — Arent Fox LLP; Michael Fainberg

(57) ABSTRACT

A method and system is provided for optimization of restoration and loading of an operating system of a computer. An exemplary method includes initiating a loading of the operating system of the computer and intercepting a read request of data of a data volume from the operating system. Furthermore, the method includes determining whether the data has previously been restored during the loading of the operating system, and, if the data has previously been restored, performing the read request and returning to the loading of the operating system of the computer. Alternatively, if the data has not previously been restored, determining whether the data is stored in cache of the computer. If the data is not be stored in the cache, the method includes reading the data from a data archive and storing the data read from the data archive to the cache.

19 Claims, 9 Drawing Sheets

(56) References Cited

U.S. PATENT DOCUMENTS

| | | | | |
|---|---|---|---|---|
| 8,347,137 B1* | 1/2013 | Chepel | ............... | G06F 11/1417 714/6.12 |
| 2006/0143501 A1* | 6/2006 | Tormasov | ........... | G06F 11/1417 714/6.3 |
| 2009/0249055 A1* | 10/2009 | Itoh | ...................... | G06F 9/4401 713/2 |
| 2010/0070751 A1* | 3/2010 | Chu | ..................... | G06F 9/4406 713/2 |
| 2010/0191946 A1* | 7/2010 | Cheston | ................... | G06F 3/06 713/2 |
| 2012/0005413 A1* | 1/2012 | Kawamura | ......... | G06F 11/1076 711/103 |
| 2015/0089102 A1* | 3/2015 | Kumar | ................. | G06F 9/4418 710/262 |

* cited by examiner

SYSTEM AND METHOD FOR OPTIMIZATION OF OPERATING SYSTEM RESTORE

CROSS REFERENCE TO RELATED APPLICATIONS

This application claims priority to U.S. Patent Provisional Application Ser. No. 62/172,869, filed Jun. 9, 2015, entitled "Optimization of Operating System Restore from Cloud", the entire contents of each of which are incorporated herein by reference into the present application.

FIELD OF TECHNOLOGY

The present disclosure generally relates to the technology of computer operation, and, more specifically to a method and system for optimization of restoration and loading of an operating system of a computer system.

BACKGROUND

An operating system ("OS") consists of program modules within a computer system that govern the control of equipment resources such as processors, main storage, secondary storage and I/O devices. These modules resolve conflicts, attempt to optimize performance and simplify the effective use of the computer. They act as an interface between the user programs and the physical computer hardware.

Restoring and loading of an OS is a critical feature of computer operation that uses time and resources of the computer. Conventional systems allow for loading of the OS prior to completion of the restore, and then for launching the loaded OS while the restoration process works in the background. However, this process is typically slow because data is restored from an image and from an archive at the same time. For example, in such conventional systems, for each read request, data is read from the archive and placed in the network, which results in lost time necessary for downloading the required data. Moreover, for each read request, data must also be restored to the volume, which leads to lost time for the write operations.

A conventional method for loading an operating system is illustrated in FIG. 1. As shown, the OS is initially loaded in step 12. During the loading, an interceptor (e.g., a module of the computer processing unit ("CPU")) of the computer can intercept operation requests to data volumes of the computer, such as read request of the data, in step 14. When intercepted, the CPU will check in step 16 whether the OS has been fully restored. If the OS is restored, the process can read data from cache in step 17 and send a read operation to the data volume in step 18. The process can then return to the loading of the OS at step 12. Otherwise, if the OS has not been fully restored, the CPU can read the data from a data archive in step 19 and save the data to a memory cache of the computer in step 20. Again, the CPU returns the process to the loading of the OS in step 12. As noted above, this conventional process for loading an OS of a computer can be slow Accordingly, it is desired to provide a system and method where the OS being restored is launched faster to provide services (e.g., data operations) for the user while the restoration is being completed.

SUMMARY

Accordingly, the present disclosure is related to a system, method and a computer program product for restoring and launching an operating system of a computer that substantially obviates one or more of the disadvantages of conventional systems.

According to one aspect, a method is disclosed for restoring an operating system of a computer. According to this aspect, the method includes initiating, by a processor, a loading of the operating system of the computer; intercepting, from the operating system, a read request of data of a data volume of the computer; determining, by the processor, whether the data has previously been restored during the loading of the operating system; if the data has previously been restored, performing the read request and returning to the loading of the operating system of the computer; if the data has not previously been restored, determining whether the data is stored in cache of the computer; and if the data is determined to not be stored in the cache, reading the data from a data archive and storing the data read from the data archive to the cache.

According to another aspect, the method further includes reading the data from the cache if the data is determined to be stored in the cache and returning to the loading of the operating system of the computer.

According to another aspect, the determining of whether the data is stored in the cache of the computer comprises at least one of checking a bitmap and checking a region collection.

According to another aspect, the method further includes writing the data to the data volume if the data is determined to be stored in the cache; marking the data as restored once it is written to the data volume; and deleting the data from the cache of the computer.

According to another aspect, the marking of the data as restored comprises at least one of resetting a portion of bits in the bitmap and adding regions to the region collection.

According to another aspect, the method further includes determining, by the processor, whether all data required for the loading of the operating system has been restored; and switching off a filter and revealing a disk of the computer if all the data is determined to be restored.

According to another aspect, the method further includes intercepting, from the operating system, a write request of data to the data volume of the computer; determining, by the processor, whether the data of the write request has previously been restored during the loading of the operating system; if the data has previously been restored, writing the data to the data volume; if the data has not previously been restored, determining whether the data is stored in the cache of the computer; and if the data is determined to not be stored in the cache, writing the data to the data volume and marking the data as restored once it is written to the data volume.

According to another aspect, the method further includes deleting the data from cache if the data is determined to be stored in the cache; and writing the data to the data volume and marking the data as restored once it is written to the data volume.

According to another aspect, the method further includes monitoring the cache of the computer to determine if available space of the cache is below a predetermined threshold or the cache is full; saving data in the cache to the data volume if the available space of the cache is below the predetermined threshold or the cache is full; and deleting the data from the cache.

According to another aspect, a system is disclosed for restoring an operating system of a computer. According to this aspect, the system includes memory configured to store a data volume of the computer; cache configured to temporarily store data; a data archive; and a processor. According to the exemplary aspect, the processor is configured to initiate a loading of the operating system of the computer; intercept, from the operating system, a read request of data of the data volume of the computer; determine whether the data has previously been restored during the loading of the operating system; if the data has previously been restored, perform the read request and return to the loading of the operating system of the computer; if the data has not previously been restored, determine whether the data is stored in the cache of the computer, and if the data is determined to not be stored in the cache, read the data from the data archive and store the data read from the data archive to the cache.

According to another aspect, a non-transitory computer readable medium storing computer executable instructions is disclosed for restoring an operating system of a computer. According to this aspect, instructions are included for initiating a loading of the operating system of the computer; intercepting, from the operating system, a read request of data of a data volume of the computer; determining whether the data has previously been restored during the loading of the operating system; if the data has previously been restored, performing the read request and returning to the loading of the operating system of the computer; if the data has not previously been restored, determining whether the data is stored in cache of the computer; and if the data is determined to not be stored in the cache, reading the data from a data archive and storing the data read from the data archive to the cache.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
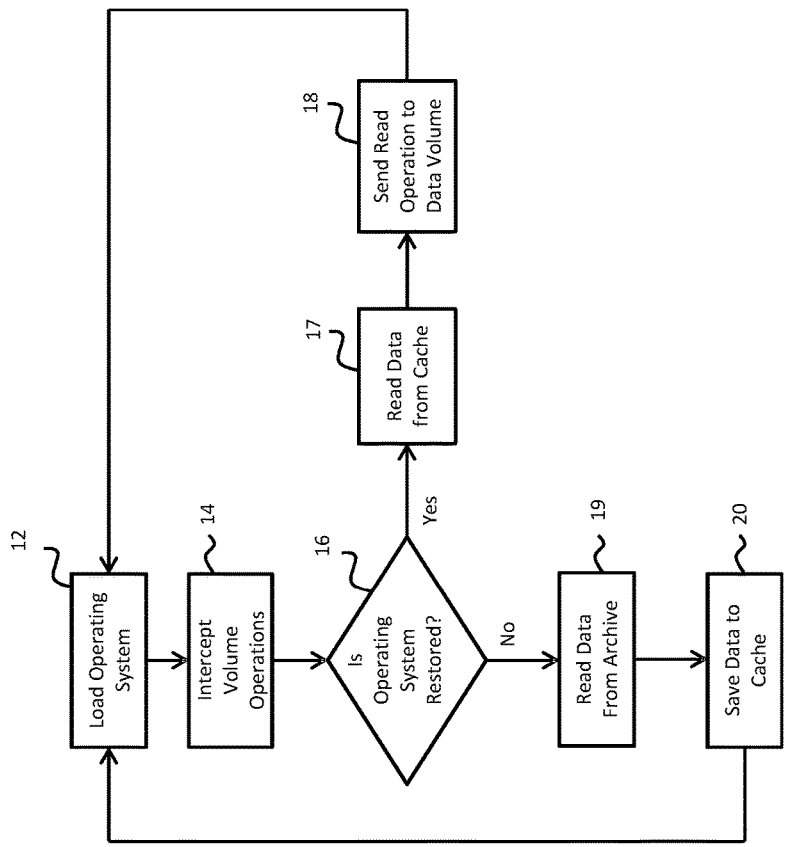
FIG. 1 illustrates a flowchart for a conventional method of loading an operating system of a computer system.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The present disclosure is directed to a system and method of launching and restoring an operating system. According to the exemplary aspect, the disclosed system and method provides for an improved and faster launching of the operating system of a computer.

Figure 2A:
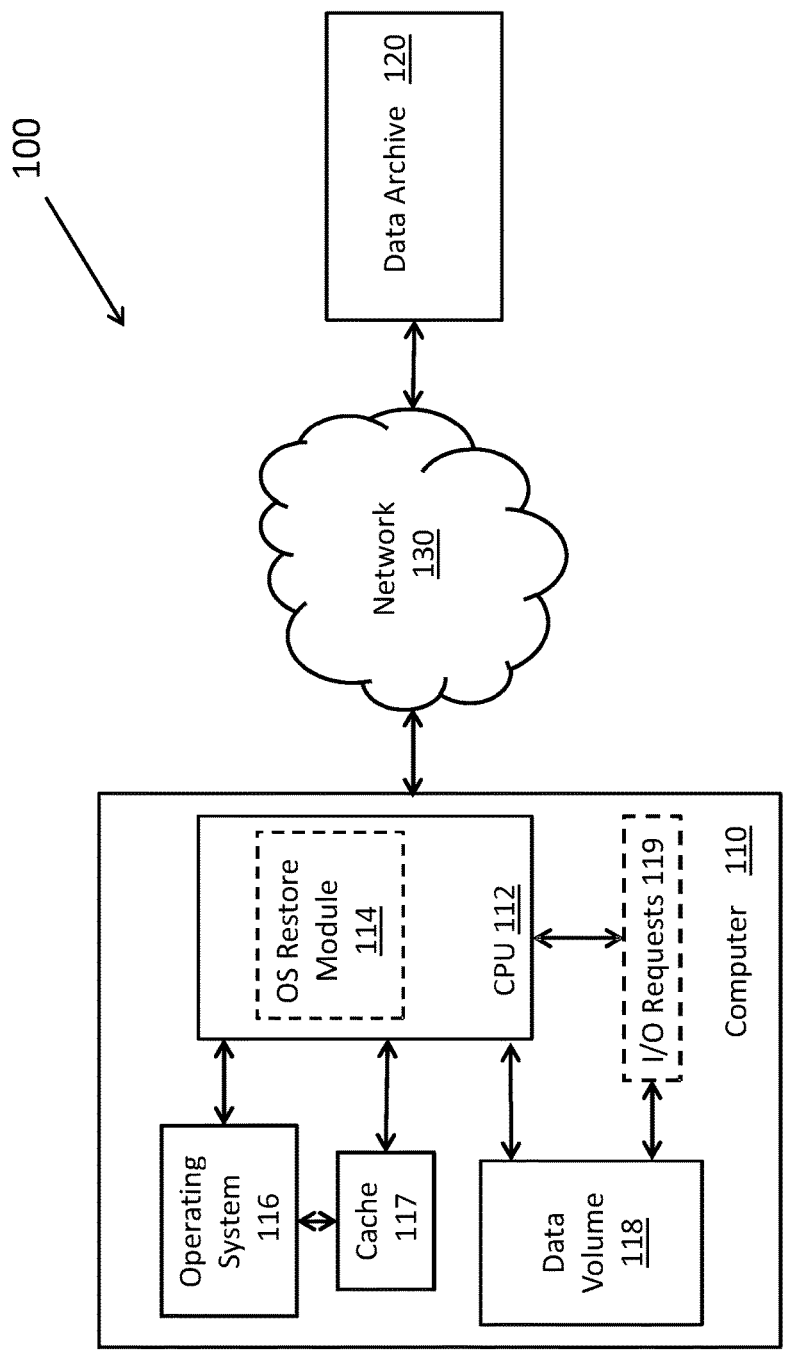
FIG. 2A illustrates a block diagram illustrating a system for optimization of the restoration and loading of an operating system of a computer system according to an exemplary aspect.

Specifically, FIG. 2A illustrates a block diagram for a system for optimization of the restoration and loading of an operating system of a computer system according to an exemplary aspect. As shown, the system 100 includes a computer 110, data archive 120, and network 130. According to one aspect, it is contemplated that the data archive 120 can generally include hardware and software components configured to manage various storage resources within the computing environment. For example, the data archive 120 can include one or more data storage devices (e.g., hard disk drives, optical drives, magnetic tape drives and/or the like) and storage management software that provides an interface to the one or more data storage devices. The data archive 120, which can be a data cloud storage service according to one aspect, facilitates temporary and/or permanent storage of computer data, including data of computer 110. The computer data may be any type of electronic, digital data generated and/or stored by a computer. For example, the computer data can represent text data, executable program code, audio, video or image data, or any other type of digital data.

Furthermore, according to the exemplary aspect, network 130 is provided to process data communications between computer 110 and data archive 120. According to another aspect, computer 110 can be directly or physically computer to data archive 120. It should be appreciated that network 130 can be any network for communicating data and data operations and can include a communication system (not shown) that connects the various components of the system 100 by wire, cable, fiber optic, and/or wireless links facilitated by various types of well-known network elements, such as hubs, switches, routers, and the like. Network 130 may employ various well-known protocols to communicate information amongst the network resources. In one aspect, the network 130 can be part of the Internet or intranet using various communications infrastructure such as Ethernet, WiFi and the like.

According to the exemplary aspect, the computer 110 is capable of communicating with the data archive 120 via network 130. According to the exemplary aspect, the computer 110 may be any type of computing device, such as a laptop, a desktop, a tablet, a mobile phone and the like. The specific hardware details of the exemplary computer 110 will be described below with respect to FIG. 6.

However, as generally shown in FIG. 2A, the computer 110 includes a central processing unit ("CPU") 112 provided to, among other things, execute an OS restore module 114. In this aspect, the OS restore module 114 includes software code (e.g., processor executable instructions) in memory, which may be configured to execute/facilitate the loading and restoring of the operating system 116 of the computer.

Referring back to the computer 110, the OS restore module 114 can intercept input/output requests 119 that can be, for example, one or more system calls, including file management functions such as create file, open file, close file, rename file, delete file, read data, write data and/or the like, associated with the loading/launching of the operating system computer 116, other services and applications for the user of the computer 110, or the like. According to an exemplary aspect, the system and method can be provided to work both on the file system level and the volume level. Specifically, at a restore of file system level, the system operates with files. As such, the OS restore module 114 can intercept is configured to intercept file management functions, such as create file, open file, read file, write file, and the like. When the system is operating at the volume level, the system is operating to restore sectors (e.g., disk sectors) so the OS restore module 114 can intercept operations including read sector, write sector, and the like.

The computer 110 further includes cache 117 and data volume 118. According to the exemplary aspect, the data volume 118 can be a single accessible storage area with a single file system, which, according to one aspect, can be resident on a single partition of a hard disk of the computer 110. For purposes of the present disclosure, the OS restore module 114 intercepts data read and data write requests during the loading and restoring of the OS 116, as will be described in detail below. Moreover, cache 117 is provided to receive data downloaded from the data archive to increase speed working with the remote archive and to store data planned to be written to the data volume 118 to avoid losing time on writing data to the disk.

Figure 2B:
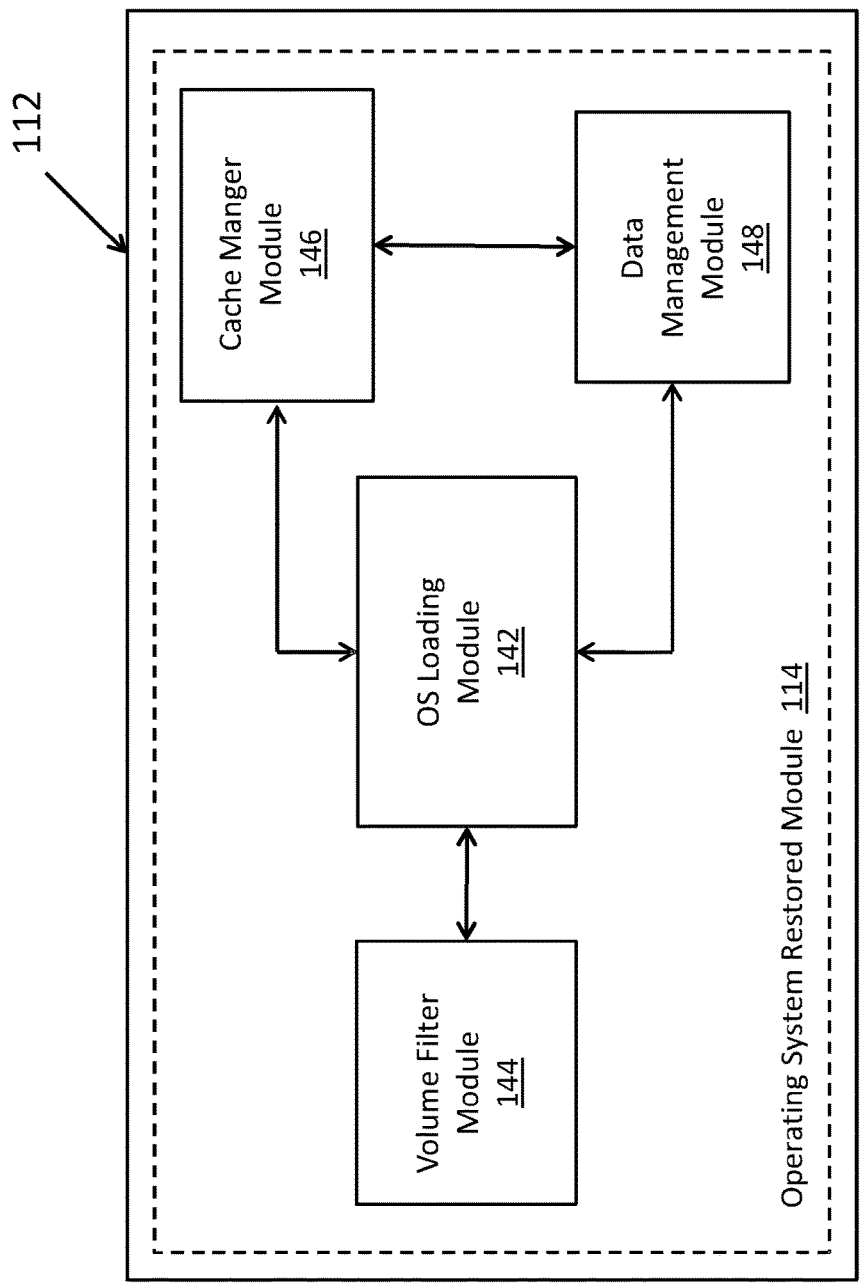
FIG. 2B illustrates a block diagram of the computer processing unit of the system shown in FIG. 2A for the restoration and loading of an operating system of a computer according to an exemplary aspect.

FIG. 2B illustrates a block diagram of the computer processing unit (CPU) 112 of the computer 110 system shown in FIG. 2A for the restoration and loading of an operating system of a computer according to an exemplary aspect. In particular, as described above, the CPU 112 can include the OS restore module 114. According to the exemplary aspect shown in FIG. 2B, the OS restore module 114 can be composed of a plurality of modules. As used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown, the OS restore module 114 can include OS loading module 142, volume filter module 144, cache manager module 146, and data management module 148. For purposes of the disclosure below with respect to the exemplary algorithms, the disclosure generally refers to the OS restore module 114 and/or one of the specific modules as shown to perform the various steps of the algorithm.

According to the exemplary aspect, the OS restore module 114 is configured to perform the booting of the computer system 110, which includes the initialization of the computerized system. As is well known to those skilled in the art, the booting process can be "hard", after electrical power to the CPU 112 is switched from off to on (in order to diagnose particular hardware errors), or "soft", when those power-on self-tests (POST) can be avoided. Moreover, soft booting can be initiated by hardware such as a button press, or by software command. Booting is complete when the normal, operative, runtime environment is attained.

It should be appreciated that the OS restore module 114 can utilize a boot loader that loads the OS 116 for the computer 110 after completion of the power-on self-tests. Moreover, the OS restore module 114 can perform the necessary power-on self-tests, locating and initializing peripheral devices of the computer, and then finding, loading and starting the OS 116.

As will be described in further detail below, the volume filter module 144 is configured to intercept read and write request from the operating system 116, for example, to access data or write data from or to data volume 118 to facilitate the launching and restoring of the operating system, for example. Moreover, the cache manager module 146 is configured to access and manage cached data in the cache 117 of the computer 110. Furthermore, the data management module 148 is configured to access and write data to data volume 118 and/or data archive 120. The specific algorithms for performing the read and write requests will be described as follows.

According to the exemplary aspect, the OS restore module 114 (and the specific sub-modules) is configured to perform the optimization of the loading and restoring of the OS 116 of computer 110 according to an exemplary aspect. In particular, the OS restore module 114, and, more particularly, the OS loading module 142 is configured to perform the loading functions of the OS 116 while the OS restore module 114 is also able to process certain data operations (e.g., I/O requests 119) to data volume 118. As noted above, the volume filter module 144 is configured to intercept the data operations, such as read and write requests to the data volume 118 once the OS loading module 142 begins loading the OS 116 of the computer 110 during boot time.

Specifically, if the volume filter module 144 intercepts a read request of the data volume 118, the OS loading module 142 confirms whether the requested data has been restored for the operating system. If the requested data has been restored, the data management module 148 can access and read the data from the actual data volume 118. At that point, the OS loading module 142 will return the process to the loading of the OS 116 of the computer 110. Alternatively, if the data has not been restored, the cache manager module 146 will determine whether the requested data is in cache 117. If the cache manager module 146 determines the requested data is in cache 117, the cache manager module 146 will access and read the requested data before the OS loading module 142 will return the process to the loading of the OS 116 of the computer 110. If the cache manager module 146 determines that the requested data is not stored in cache 117, the data management module 148 will read data from data archive 120 by network 130, for example. Once the requested data is access from data archive 120, the cache manager module 146 will copy the read data to the cache 117. Again, at that point the OS loading module 142 will return the process to the loading of the OS 116 of the computer 110.

According to another aspect, the volume filter module 144 may intercept a write request to data volume 118. Again, upon receipt of the request, the OS loading module 142 first confirms whether the requested data has been restored for the operating system. If the requested data has been restored, the data management module 148 can write the data to the actual data volume 118 and the OS loading module 142 will then return to the process of the loading the OS 116 of the computer 110. Alternatively, if the requested data has not yet been restored, the cache manager module 146 can access cache 117 to determine whether the data is in cache 117. If the cache manager module 146 detects the data in cache 117, the data management module 148 further writes the data to data volume 118, marks the data as restored, and the deletes the data from cache 117. Alternatively, if the data is not located in cache 117, the data management module 148 further writes the data to data volume 118 and then marks the data as restored. In either case, once the data is marked as restored, the OS loading module 142 will then return to the process of the loading the OS 116 of the computer 110.

According to yet a further aspect of the disclosed system, the cache manager module 146 is configured to manage cache 117 when it becomes full or when a low memory condition occurs. In particular, during the process of loading and restoring OS 116 of computer 110, the cache manager module 146 can remove data from cache 117 at any time if it detects that cache 117 is full or low on memory space. Moreover, the cache manager module 146 can write the cached data to data volume 118 until a threshold has been reach (e.g., a threshold of necessary free space in cache 117). Alternatively, if the cache manager module 146 detects that the cache 117 is not full, it can continue to wait for a signal that the OS loading module 142 has begun the restoring processing. This signal will typically occur after the OS 116 begins the booting process and the user has logged onto the computer 110.

Figure 3A:
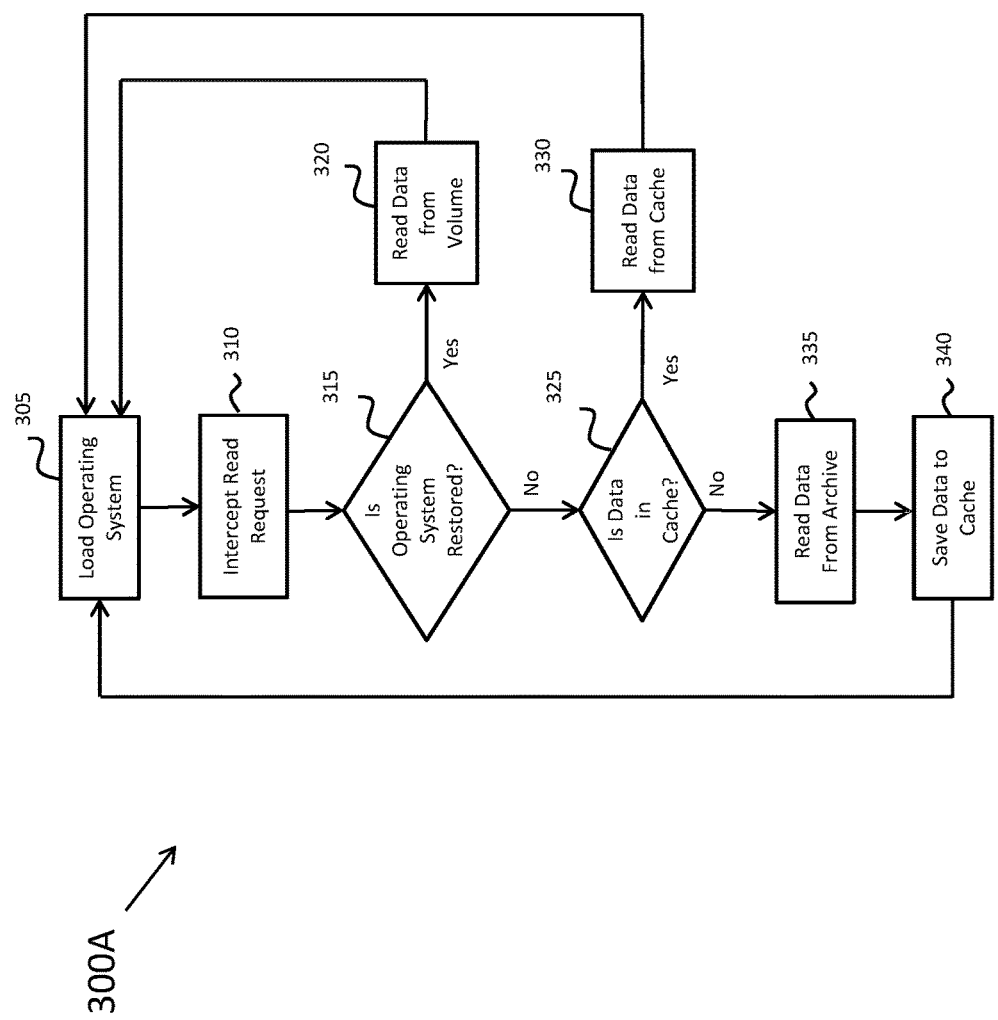
FIG. 3A illustrates a flowchart for a method for processing a read request during the restoration and loading of an operating system of a computer according to an exemplary aspect.

FIG. 3A illustrates a flowchart for a method for optimization of the restoration and loading of an operating system of a computer according to an exemplary aspect. As shown, initially, at step 305, the OS restore module 114 begins the process of loading the OS 116 of computer 110. Next, at step 310, the volume filter module 144 can intercept a read request from the OS 116 of data from data volume 118. Upon detection of the read request, the OS loading module 142 confirms whether the requested data has been restored for the operating system in step 315. If this portion of the data has been restored, the process (e.g., the data management module 148) can read the data from data volume 118 in step 320, at which point the OS restore module 114 begins control again of the OS loading process in step 305. Alternatively, if the OS loading module 142 determines that the requested data has not been restored for the operating system, the cache manager module 146 can determine whether the requested data is in a cache 117 in step 325. According to one aspect, the cache manager module 146 can use a bitmap of cached data or regions collection (i.e., a region is a pair of two values: start offset and length) in order to check for cached data in cache 117 of the computer 110.

If the requested data is determined to be in cache 117, the cache manager module 146 reads the data from cache 117 in step 330, at which point the OS loading module 142 begins control again of the OS loading process in step 305. However, if the requested OS data is not stored in cache 117 in step 325, the data management module 148 can read the requested OS data from a data archive stored on data volume 118 in step 335. Once the data is accessed from the data archive on data volume 118, the cache manager module 146 can copy the data to cache 117 in step 340. Again, the OS loading module 142 can reassume control of the OS loading process in step 305. It should be appreciated that the data archive on data volume 118 can reside on a different volume or can be placed remotely (on external storage or network storage, such as data archive 120). Moreover, according to an exemplary aspect, the requested OS data can include any volume data, such OS files, user files, application files, and the like.

Figure 3B:
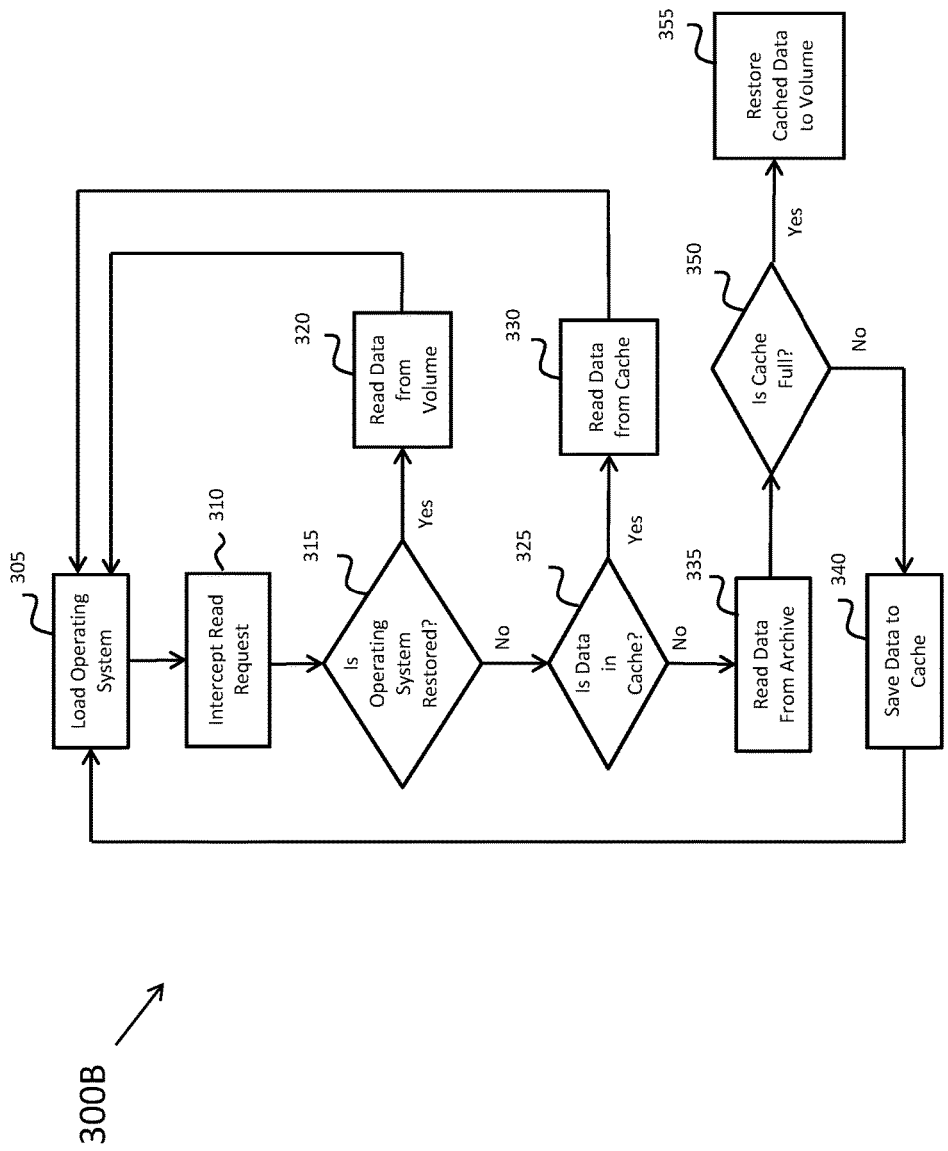
FIG. 3B illustrates a flowchart for a refinement to the method shown in FIG. 3A for processing a read request during the restoration and loading of an operating system of a computer according to an exemplary aspect.

FIG. 3B illustrates a flowchart for a refinement to the method shown in FIG. 3A for optimization of the restoration and loading of an operating system of a computer according to an exemplary aspect. As described above, the cache manager module 146 is configured to manage cache 117 when it becomes full or when a low memory condition occurs. Thus, the exemplary method shown in FIG. 3B illustrates the algorithm for managing cache 117 by the cache manager module 146.

As shown, the method illustrated in FIG. 3B primarily includes the same steps of FIG. 3A, whose description will not be repeated as follows. Namely, FIG. 3B also includes steps 305-340. However, as shown, the cache manager module 146 is configured to manage the cached data in cache 117 in steps 350 and 355. In particular, after the data management module 148 reads the requested data from data volume 118, the cache manager module 146 checks the cache 117 in step 350 before saving the read data to cache in step 340. If the cache manager module 146 determines that the cache 117 is full (i.e., it has reached a threshold size), the cached data is restored to the data volume 118 in step 355. According to one exemplary aspect, the threshold can be, for example, a half of "nonpaged pool". Moreover, it should be appreciated that a low memory condition can be checked by a special system event. According to one further refine, the cache manager module 146 continues to monitor the cache 117 if it is not full.

Figure 3C:
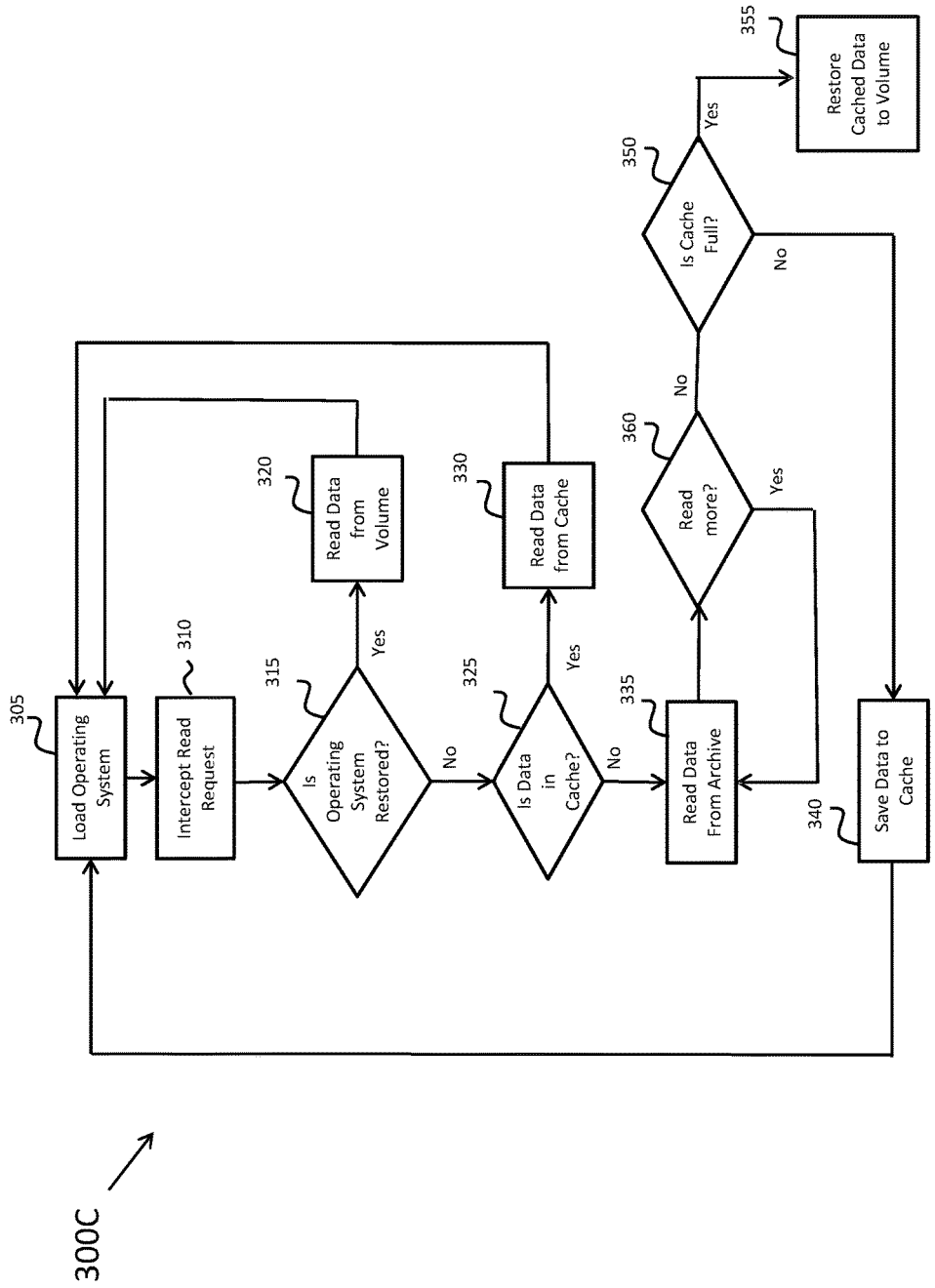
FIG. 3C illustrates a flowchart for a refinement to the method shown in FIG. 3A for processing a read request during the restoration and loading of an operating system of a computer according to an exemplary aspect.

FIG. 3B illustrates a flowchart for a refinement to the method shown in FIG. 3A for processing a read request during the restoration and loading of an operating system of a computer according to an exemplary aspect. As shown, the method illustrated in FIG. 3C primarily includes the same steps of FIG. 3B, whose description will not be repeated as follows. Namely, FIG. 3C also includes steps 305-355. However, as shown, the method is further configured to perform a continuous loop, at step 360, to read additional data, if available, from the data archive on data volume 118 and store this additional data in cache 117. Advantageously, cache 117 receive the data downloaded from the data archive on data volume 118, which increases the speed working with the remote archive and avoids losing time on writing data to the disk.

Figure 4:
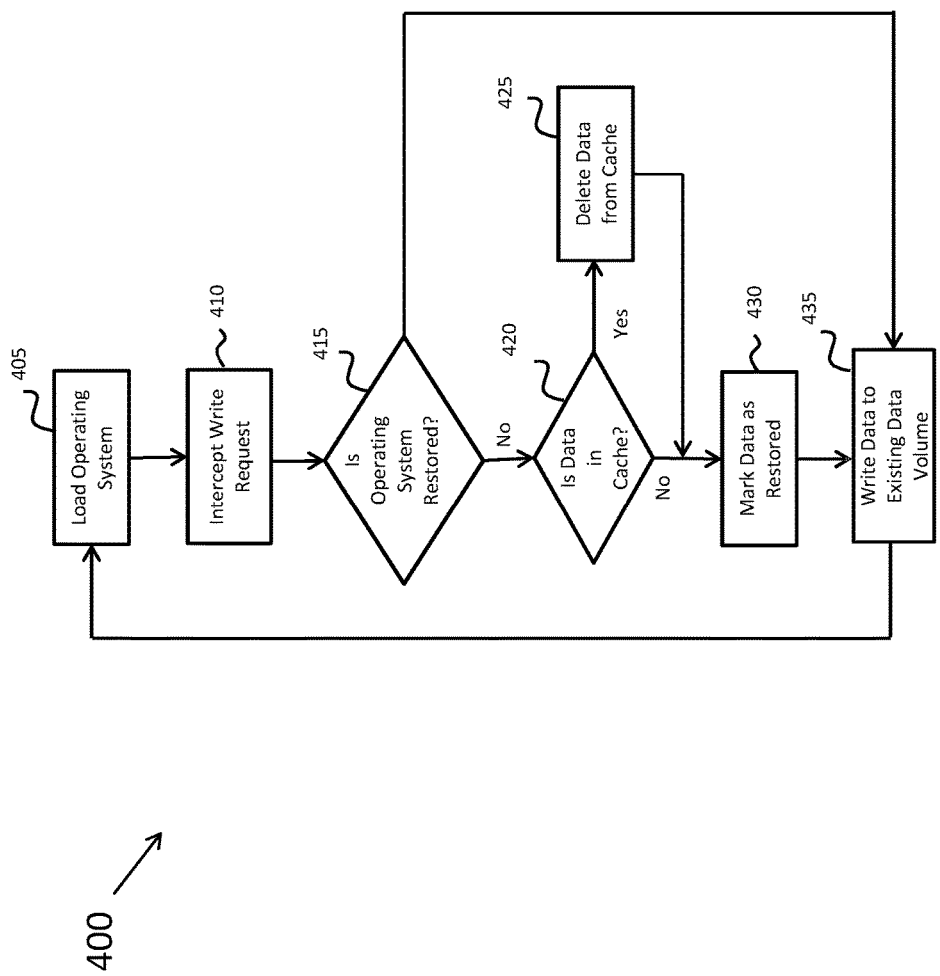
FIG. 4 illustrates a flowchart for a method for processing a write request during the restoration and loading of an operating system of a computer according to an exemplary aspect.

FIG. 4 illustrates a flowchart for a method for processing a write request during the restoration and loading of an operating system of a computer according to an exemplary aspect. As shown, initially, at step 405, the OS restore module 114, and, specifically, the OS loading module 142, begins the process of loading the OS 116 of computer 110. Next, at step 410, the volume filter module 144 can intercept a write request from the OS 116 of data to data volume 118. Upon detection of the write request, the OS loading module 142 confirms whether the requested data has been restored for the operating system in step 415. According to one exemplary aspect, the OS loading module 142 can perform this function using a bitmap or a regions collection as would be understood to one skilled in the art. If the requested OS data is restored, the process writes the data to a data volume 118 in step 435. If the requested OS data has not yet been restored, the cache manager module 146 at step 420 checks the cache 117 to determine whether the requested data is stored as cached data. If the data is stored as cached data in cache 117, the cache manager module 146 deletes the data from cache 117. As shown, in either case (even if the data is not stored in cache 117), the method proceeds to step 430 where the process marks the requested OS data as "restored". According to the exemplary aspect, this step is performed by the OS restore module 114, which is configured to set or reset certain bits in a bitmap or by add some regions to the region collection. The method then proceeds to step 435 where the data management module 148 writes the data to data volume 118. At that point, the process can return to step 405 where the OS loading module 142 continues the process of loading the OS 116 of computer 110.

Figure 5:
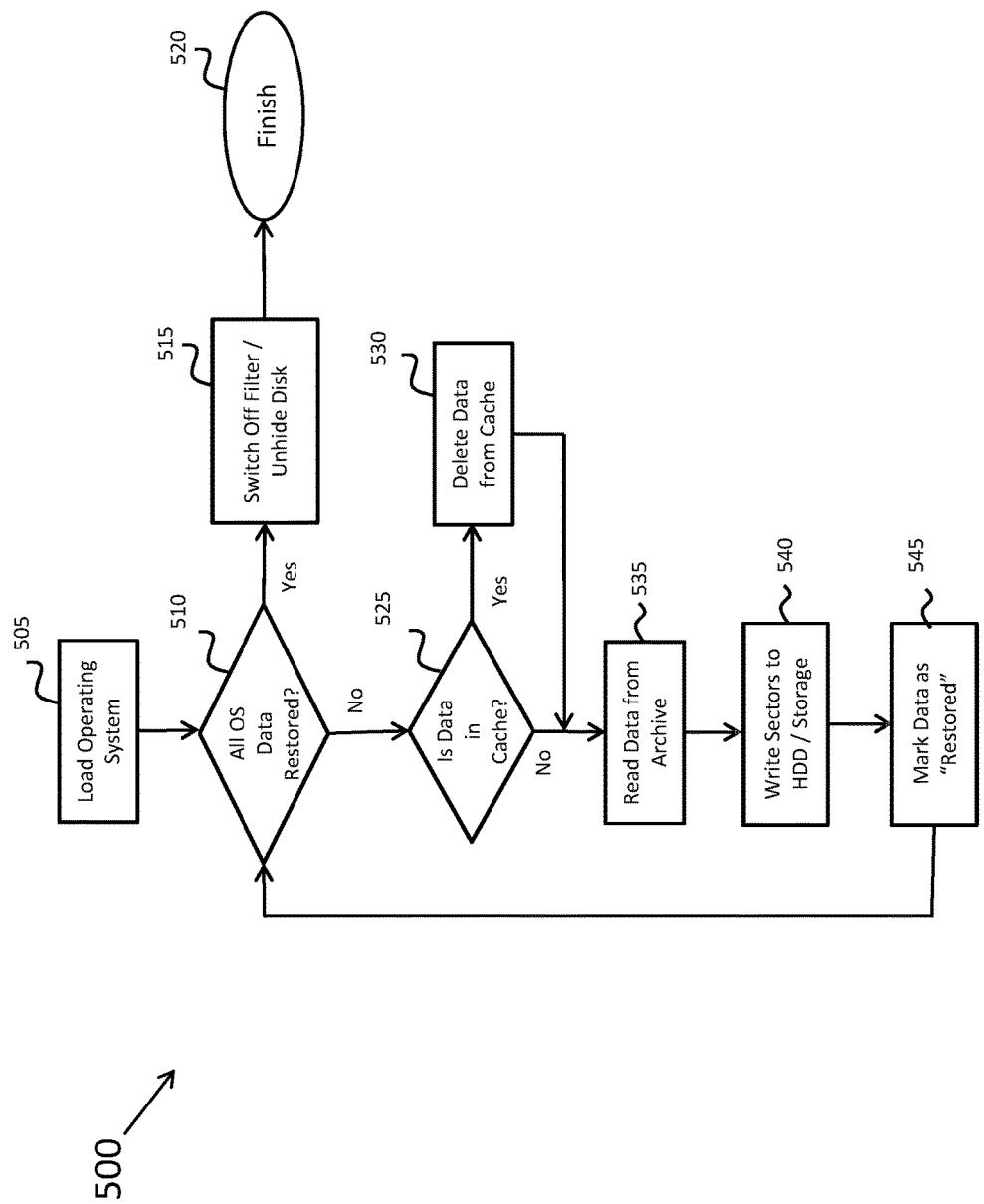
FIG. 5 illustrates a flowchart for a method for restoring an operating system of a computer according to an exemplary aspect.

FIG. 5 illustrates a flowchart for a method for restoring an operating system of a computer according to an exemplary aspect. As shown, initially, at step 505, the OS restore module 114 begins the process of loading the OS 116 of computer 110. As further described above the OS restore module 114 can continue to load the OS while intercepting and processing requests from the OS 116 to read and/or write data to and from data volume 118. According to the method shown in FIG. 5, during restore processing, the process checks if all OS data is restored in step 510. If all the data has been restored, the process switches off the filter (i.e., unhides/reveals the disk if operating on the volume level or files if operating on the file system level) in step 515 and completes the restoring process at step 520. Alternatively, if the OS restore module 114 determines that all OS data has not been restored, the process at step 525 checks if data is stored in cache 117. If data is in cache 117, the cache manager module 146 reads the cached data from cache 117 and then deletes the data from cache 117 in step 530.

In either case (even if the data is not stored in cache 117), the method proceeds to step 535 where data can be read from data archive 120. The process then writes the data to the physical HDD storage in step 540. Next, at step 545, the process then marks the OS data as "restored". As noted above, according to one aspect, this step is performed by the OS restore module 114, which is configured to set or reset certain bits in a bitmap or by add some regions to the region collection. The method then returns to step 510 to confirm whether all OS data has been restored.

According to another aspect of the disclosed method and system, another option is when an image for restore is stored in a cloud storage, such as data archive 120. One such example is where it is factory image for laptop provided by a laptop vendor. When a user wants to reset his laptop system and roll it back to initial state, the user does not want the internally placed factory image, but instead downloads the image from vendor's cloud. To make this process faster, the enhanced method and system can be implemented as described above. Thus, the disclosed algorithms can be connected to cloud-based image storing because any restoration from cloud is usually quite slow. However, typically, to start working, the user does not need an entire disk, but only 10% or 5%, for example, so this is a critical feature for restoring from a cloud. Thus, a vendor can continuously update and patch only the version of the backup stored on the cloud, rather than having to update the user's computers all the time. It is further noted that the initial image from the vendor can be used as a base image (possibly shared among multiple users), and other (later) images can be used as incremental backups (possibly user-specific incremental ones) according to an exemplary aspect.

Additionally, according to one aspect, a preparation tool for collecting prefetch statistics can be used later during disclosed method, using, for example, a Windows® prefetch mechanism, (see, for example, http:windows.microsoft-.com/ru-ru/windows-vista/what-is-the-prefetch-folder). This tool can be used both internally to preselect prefetch settings, depending on the OS and on the user's side in case the user wants faster loading from the network. For example, the data that can be used for loading the OS can be identification of the blocks/sectors that are needed by the OS 116** to be loaded in the order in which they are read. The statistics can be stored in the cloud, and tied to the image/image slice in the archive.

According to yet a further aspect of the disclosed system and method, a heuristic model for forecasting prefetch settings on the user side based on statistics collected by the preparation tool, as described above. As one option, a slice is taken in the cloud and the slice is provide to a virtual machine. In turn, the virtual machine can begin loading from the slice, and turn on a special tracker to determine the order of the blocks/sectors that are read by the OS 116 in the process of loading from the slice. The statistics are then linked to the archive. When the user needs to restore from the cloud, he can use the statistics together with the prefetch mechanism. According to a further aspect, the concept can be applied both to vendor-originated backups and user originated backups.

Figure 6:
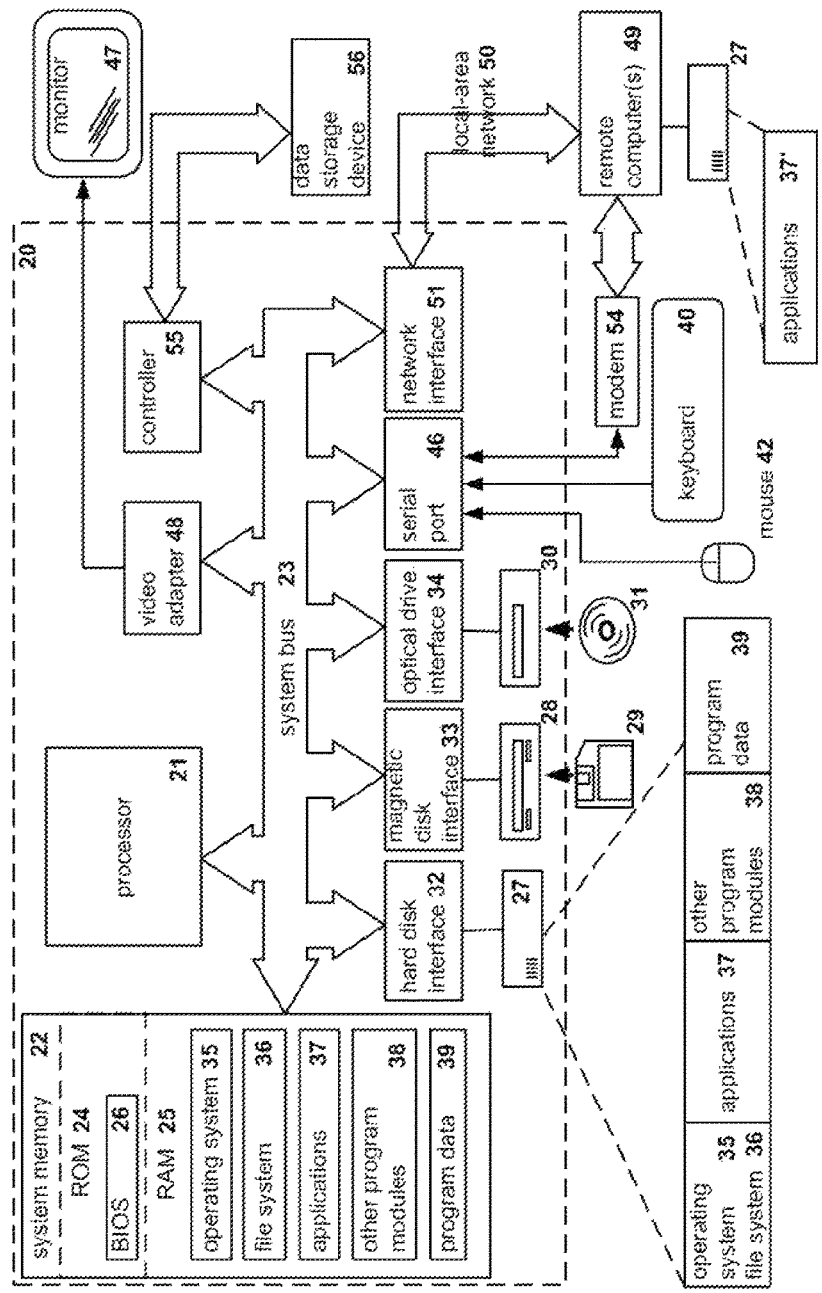
FIG. 6 illustrates an example of a general-purpose computer system on which the disclosed systems and method can be implemented.

FIG. 6 illustrates an example of a general-purpose computer system (which may be a personal computer or a server) on which the disclosed systems and method can be implemented according to an example aspect. It should be appreciated that the detailed general-purpose computer system can correspond to the computer 110 provided to implement the algorithms described above.

As shown in FIG. 6, the computer system 20 includes a central processing unit 21, a system memory 22 and a system bus 23 connecting the various system components, including the memory associated with the central processing unit 21. The central processing unit 21 can correspond to the CPU 112 and the system memory 22 can correspond to data volume 118 of FIG. 2A, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for restoring an operating system of a computer, the method comprising:
   initiating, by a processor, a loading of the operating system of the computer;
   intercepting, from the operating system, a function request for data from a data volume of the computer, wherein the function request comprises file management functions and sector functions;
   determining, by the processor, whether the data has previously been restored during the loading of the operating system;
   if the data has previously been restored, performing the function request to read the data from the data volume and returning to the loading of the operating system of the computer;
   if the data has not previously been restored, determining whether the data is stored in a cache of the computer and if the data is stored in the cache, performing the function request to read the data from the cache, deleting the data from the cache and then returning to the loading of the operating system of the computer;

if the data is determined to not be stored in the cache, reading the data and continuously reading additional data from a data archive and storing the data read and continuously storing the additional data from the data archive to the cache until the cache is full and then returning to the loading of the operating system of the computer.

2. The method of claim 1, further comprising reading the data from the cache if the data is determined to be stored in the cache and returning to the loading of the operating system of the computer.

3. The method of claim 1, wherein the determining of whether the data is stored in the cache of the computer comprises at least one of checking a bitmap and checking a region collection.

4. The method of claim 3, further comprising:
writing the data to the data volume if the data is determined to be stored in the cache;
marking the data as restored once it is written to the data volume; and
deleting the data from the cache of the computer.

5. The method of claim 4, wherein the marking of the data as restored comprises at least one of resetting a portion of bits in the bitmap and adding regions to the region collection.

6. The method of claim 1, further comprising:
determining, by the processor, whether all data required for the loading of the operating system has been restored; and
switching off a filter and revealing a disk of the computer if all the data is determined to be restored.

7. The method of claim 1, further comprising:
intercepting, from the operating system, a write request of data to the data volume of the computer;
determining, by the processor, whether the data of the write request has previously been restored during the loading of the operating system;
if the data has previously been restored, writing the data to the data volume;
if the data has not previously been restored, determining whether the data is stored in the cache of the computer; and
if the data is determined to not be stored in the cache, writing the data to the data volume and marking the data as restored once it is written to the data volume.

8. The method of claim 7, further comprising:
deleting the data from cache if the data is determined to be stored in the cache; and
writing the data to the data volume and marking the data as restored once it is written to the data volume.

9. The method of claim 1, further comprising:
monitoring the cache of the computer to determine if available space of the cache is below a predetermined threshold or the cache is full;
saving data in the cache to the data volume if the available space of the cache is below the predetermined threshold or the cache is full; and
deleting the data from the cache.

10. A system for restoring an operating system of a computer, the system comprising:
a processor configured to:
load the operating system of the computer;
intercept, from the operating system, a function request for data from a data volume of the computer, wherein the function request comprises file management functions and sector functions;
determine whether the data has previously been restored during the loading of the operating system;
if the data has previously been restored, perform the function request to read the data from the data volume and returning to the loading of the operating system of the computer;
if the data has not previously been restored, determine whether the data is stored in a cache of the computer and if the data is stored in the cache, performing the function request to read the data from the cache, deleting the data from the cache and then returning to the loading of the operating system of the computer;
if the data is determined to not be stored in the cache, read the data and continuously reading additional data from a data archive and storing the data read and continuously storing the additional data from the data archive to the cache until the cache is full and then returning to the loading of the operating system of the computer.

11. The system of claim 10, wherein the processor further configured to read the data from the cache if the data is determined to be stored in the cache and return to the loading of the operating system of the computer.

12. The system of claim 10, wherein the determining of whether the data is stored in the cache of the computer comprises at least one of checking a bitmap and checking a region collection.

13. The system of claim 12, wherein the processor further configured to:
write the data to the data volume if the data is determined to be stored in the cache;
mark the data as restored once it is written to the data volume; and
delete the data from the cache of the computer.

14. The system of claim 13, wherein the marking of the data as restored comprises at least one of resetting a portion of bits in the bitmap and adding regions to the region collection.

15. The system of claim 10, wherein the processor further configured to:
determine whether all data required for the loading of the operating system has been restored; and
switch off a filter and revealing a disk of the computer if all the data is determined to be restored.

16. The system of claim 10, wherein the processor further configured to:
intercept, from the operating system, a write request of data to the data volume of the computer;
determine whether the data of the write request has previously been restored during the loading of the operating system;
if the data has previously been restored, write the data to the data volume;
if the data has not previously been restored, determine whether the data is stored in the cache of the computer; and
if the data is determined to not be stored in the cache, write the data to the data volume and marking the data as restored once it is written to the data volume.

17. The system of claim 16, wherein the processor further configured to:
delete the data from cache if the data is determined to be stored in the cache; and
write the data to the data volume and mark the data as restored once it is written to the data volume.

18. The system of claim 10, wherein the processor further configured to:

monitor the cache of the computer to determine if available space of the cache is below a predetermined threshold or the cache is full;

save data in the cache to the data volume if the available space of the cache is below the predetermined threshold or the cache is full; and delete the data from the cache.

19. A non-transitory computer readable medium storing computer executable instructions for restoring an operating system of a computer, including instructions for:

initiating a loading of the operating system of the computer;

intercepting, from the operating system, a function request for data from a data volume of the computer, wherein the function request comprises file management functions and sector functions;

determining whether the data has previously been restored during the loading of the operating system;

if the data has previously been restored, performing the function request to read the data from the data volume and returning to the loading of the operating system of the computer;

if the data has not previously been restored, determining whether the data is stored in a cache of the computer and if the data is stored in the cache, performing the function request to read the data from the cache, deleting the data from the cache and then returning to the loading of the operating system of the computer;

if the data is determined to not be stored in the cache, reading the data and continuously reading additional data from a data archive and storing the data read and continuously storing the additional data from the data archive to the cache until the cache is full and then returning to the loading of the operating system of the computer.

* * * * *